H. S. YOXALL & J. EASTHOPE.
WHEEL FOR ROLLER SKATES AND THE LIKE.
APPLICATION FILED FEB. 9, 1909.

971,164. Patented Sept. 27, 1910.

INVENTORS,
HENRY SMALLWOOD YOXALL,
and JOSEPH EASTHOPE,
by
Attorney.

WITNESSES:

UNITED STATES PATENT OFFICE.

HENRY SMALLWOOD YOXALL AND JOSEPH EASTHOPE, OF BIRMINGHAM, ENGLAND.

WHEEL FOR ROLLER-SKATES AND THE LIKE.

971,164.      Specification of Letters Patent.      Patented Sept. 27, 1910.

Application filed February 9, 1909. Serial No. 476,938.

*To all whom it may concern:*

Be it known that we, HENRY SMALLWOOD YOXALL, director and general manager, and JOSEPH EASTHOPE, departmental manager, subjects of the King of Great Britain, residing at Oliver Street Works, Birmingham, in the county of Warwick, England, have invented a new and useful Wheel for Roller-Skates and the Like; and we do hereby declare the following to be a full, clear, and exact description of the same.

Our invention comprises improvements in wheels for roller skates and refers to that class of such wheels which are made of sheet metal and in which the sides of the wheel are integral with the periphery and which have ball races integral with the wheel sides; the object of our said invention being to make a wheel stronger and simpler than those heretofore made.

According to our invention in a wheel for roller skates of that type made from sheet metal we employ in combination two wheel sides, ball races formed on the outer faces of each of said sides, a flange on one of said sides forming the peripheral tread, a recess inside said flange extending for only part of the width of said flange, and a flange on the second wheel side entering the said recess.

Figure 1:
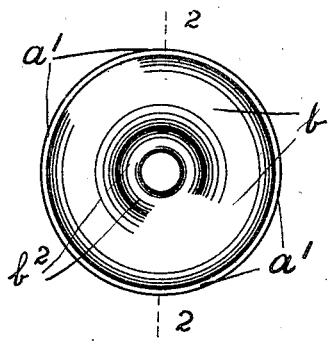
Figure 2:
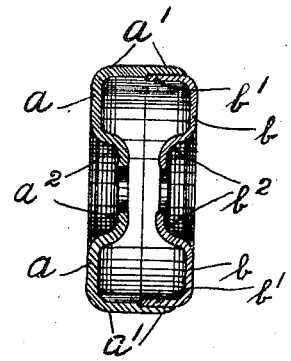
Figure 3:
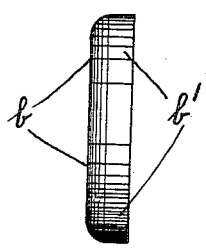
Figure 4:
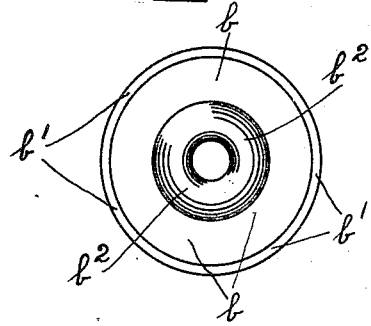
Figure 5:
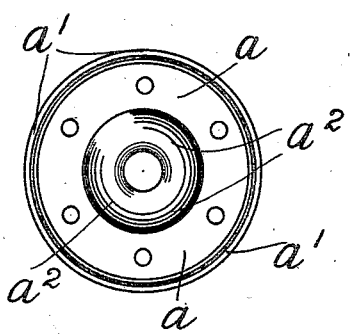
Figure 6:
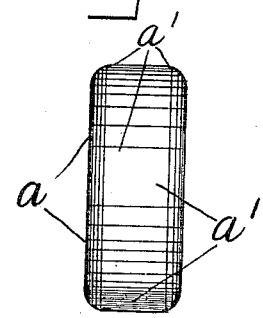

Referring to the drawings:—Figure 1. illustrates the outer face of the wheel complete. Fig. 2 is a section at 2—2 in Fig. 1. Fig. 3. is an edge view of the outer half of the wheel removed, while Fig. 4. illustrates the inner face of the same half. Fig. 5. is a similar view of the inner half of the wheel, while Fig. 6. is an edge view of same.

As illustrated upon the accompanying drawings the wheel is made from two blanks of sheet metal forming wheel sides $a$, $b$, the inner side $a$ being integral with the periphery $a^1$, while the outer side $b$ has an inwardly projecting flange $b^1$ which enters a recess in the said inner member. The ball race bearings $a^2$, $b^2$, are pressed or stamped integral with the sides of the wheel as shown; thereby avoiding all liability of the bearing becoming loose in the wheel as when it is made separate from the wheel sides in the usual manner. The ball bearing parts $a^2$, $b^2$, and the periphery are sequently hardened.

What we claim then is:—

In a wheel for roller skates made from sheet metal, the combination of a wheel side, a flange integral with said wheel side and forming of itself the tread of the wheel, a recess inside said flange, an annular recess on the outer face of the wheel side forming an integral ball race bearing part, a second wheel side an annular flange on said wheel side corresponding with the aforementioned recess, a shoulder at the bottom of said recess forming an abutment for limiting the extent to which the inner flange may be introduced into the recess, and an annular recess on the outer face of the second wheel side forming a ball race bearing part, substantially as described.

In testimony whereof, we have signed our names to this specification in the presence of two subscribing witnesses.

HENRY SMALLWOOD YOXALL.
JOSEPH EASTHOPE.

Witnesses:
ERNEST PARKER,
HAROLD C. FORESTER.